(12) United States Patent
Yakubo et al.

(10) Patent No.: US 10,468,197 B2
(45) Date of Patent: Nov. 5, 2019

(54) POROUS SEMICONDUCTOR LAYER, PASTE FOR POROUS SEMICONDUCTOR LAYER, AND DYE-SENSITIZED SOLAR CELL

(71) Applicant: SUMITOMO OSAKA CEMENT CO., LTD., Tokyo (JP)

(72) Inventors: Teppei Yakubo, Tokyo (JP); Shingo Takano, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 0 days.

(21) Appl. No.: 15/121,769

(22) PCT Filed: Feb. 23, 2015

(86) PCT No.: PCT/JP2015/054977
§ 371 (c)(1),
(2) Date: Aug. 25, 2016

(87) PCT Pub. No.: WO2015/129611
PCT Pub. Date: Sep. 3, 2015

(65) Prior Publication Data
US 2017/0069432 A1    Mar. 9, 2017

(30) Foreign Application Priority Data
Feb. 26, 2014  (JP) .................................. 2014-036052

(51) Int. Cl.
*H01G 9/20* (2006.01)
(52) U.S. Cl.
CPC ......... *H01G 9/2031* (2013.01); *H01G 9/2059* (2013.01); *H01G 9/2027* (2013.01); *Y02E 10/542* (2013.01)

(58) Field of Classification Search
CPC .......................... H01G 9/2031; H01G 9/2059
See application file for complete search history.

(56) References Cited

U.S. PATENT DOCUMENTS

| 2003/0155583 A1* | 8/2003 | Matsui | H01G 9/2031 257/200 |
| 2004/0251508 A1 | 12/2004 | Tomita | |
| 2009/0008673 A1* | 1/2009 | Kato | C08G 77/04 257/100 |

FOREIGN PATENT DOCUMENTS

| EP | 03333641 | 9/1989 |
| JP | H05-504023 | 6/1993 |
| JP | 2664194 | 10/1997 |
| JP | 2001345125 | 12/2001 |
| JP | 2003-142171 | 5/2003 |

(Continued)

OTHER PUBLICATIONS

Luca, Vittorio, et al.; Structural and Electronic Properties of Sol-Gel Titanium Oxides Studied by X-ray Absorption Spectroscopy; J. Phys. Chem. B, vol. 102, No. 52, 1998 (pp. 10650-10657) (Year: 1998).*

(Continued)

*Primary Examiner* — Edward J. Schmiedel
(74) *Attorney, Agent, or Firm* — JCIPRNET (57) ABSTRACT

A porous semiconductor layer contains anatase-type titanium oxide particles (A) which have an average primary particle size of 1 nm to 70 nm, and particles (B) obtained by coating surfaces of rutile-type titanium oxide particles, which have an average primary particle size of 100 nm to 1,000 nm, with an insulating material.

6 Claims, 1 Drawing Sheet

(56) References Cited

FOREIGN PATENT DOCUMENTS

| JP | 2003-303629 | 10/2003 |
|----|-------------|---------|
| JP | 2013251059 | 12/2013 |
| WO | 91/16719 | 10/1991 |
| WO | 94/05025 | 3/1994 |

OTHER PUBLICATIONS

Li, Gonghu, et al; Synergistic effect between anatase and rutile TiO2 nanoparticles in dye-sensitized solar cells; Dalton Trans., 2009, 10078-10085 (Year: 2009).*

Machine translation of JP-52749691-B1 corresponding to JP 2013-251059-A (Year: 2013).*

Magnesium methoxide; american elements; accessed and printed May 23, 2018; https://www.americanelements.com/magnesium-methoxide-109-88-6 (Year: 2018).*

Hyun Suk Jung, et al.; Preparation of Nanoporous MgO-Coated TiO2 Nanoparticles and Their Application to the Electrode of Dye-Sensitized Solar Cells; Langmuir 2005 21 (23), 10332-10335DOI: 10.1021/la051807d (Year: 2005).*

Ohno, Teruhisa, et al.; Synergism between rutile and anatase TiO2 particles in photocatlytic oxidation of naphthalene; Applied Catalysis A: General; vol. 244, issue 2, May 15, 2003; pp. 383-391 (Year: 2003).*

Ohno, Teruhisa, et al.; Morphology of a TiO2 Photocatalyst (Degussa, P-25) Consisting of Anatase and Rutile Crystalline Phases; Journal of Catalysis, 203, 82-86, 2001 (Year: 2001).*

Nahid Ghazyani et al.,"Dielectric core-shells with enhanced scattering efficiency as back-reflectors in dye sensitized solar cells", RSC Advances, vol. 4, No. 7, Oct. 4, 2013, pp. 3621-3626.

"Search Report of Europe Counterpart Application," dated Jun. 22, 2017, p. 1-p. 11, in which the listed reference was cited.

"International Search Report (Form PCT/ISA/210)", dated May 19, 2015, with English translation thereof, pp. 1-4.

"Office Action of China Counterpart Application," with machine English translation thereof, dated Dec. 11, 2017, p. 1-p. 17, in which the listed reference was/references were cited.

* cited by examiner

POROUS SEMICONDUCTOR LAYER, PASTE FOR POROUS SEMICONDUCTOR LAYER, AND DYE-SENSITIZED SOLAR CELL

CROSS-REFERENCE TO RELATED APPLICATION

This application is a 371 application of the International PCT Application serial no. PCT/JP2015/054977, filed on Feb. 23, 2015, which claims the priority benefit of Japan Application no. 2014-036052, filed on Feb. 26, 2014. The entirety of each of the above-mentioned patent applications is hereby incorporated by reference herein and made a part of this specification.

TECHNICAL FIELD

This invention relates to a porous semiconductor layer used in a dye-sensitized solar cell, a paste for the porous semiconductor layer, and a dye-sensitized solar cell using a porous semiconductor layer.

BACKGROUND ART

As an energy source substituting fossil fuels, a solar cell using sunlight is drawing attention and being studied in various ways. Patent Literature No. 1 to 3 disclose, as an example of a solar cell, a dye-sensitized solar cell exploiting photoinduced electron transfer of a metal complex.

The dye-sensitized solar cell has a module in which a porous light reflecting layer, a porous insulating layer, and a conductive layer (counter electrode) are laminated in this order on a porous semiconductor layer (power generating layer) onto which a dye is adsorbed as disclosed in Patent Literature No. 4. The dye is excited with visible light, and the resulting electrons are transferred to the porous semiconductor layer, whereby power is generated. Accordingly, in order to improve photoelectric conversion efficiency of the dye-sensitized solar cell, a large amount of dye needs to be adsorbed onto the surface of the porous semiconductor layer constituted with oxide semiconductor particles.

As a method for causing more dye to be adsorbed onto surfaces of oxide semiconductor particles, for example, there is a method of increasing the specific surface area of the oxide semiconductor particles by reducing the diameter of the particles.

However, if micro-sized oxide semiconductor particles are used, the number of contact points between the particles is increased, and hence the electrical resistance of the porous semiconductor layer increases. Consequently, electron transfer efficiency is reduced, and this leads to a problem of reduction of photoelectric conversion efficiency.

Patent Literature No. 5 suggests, as a method for solving the above problem, a method of causing the porous semiconductor layer to contain light scattering particles having a particle size of about 20 nm to 100 nm that is larger than the particle size of the oxide semiconductor particles.

CITATION LIST

Patent Literature

[Patent Literature No. 1] PCT Japanese Translation Patent Publication No. 5-504023
[Patent Literature No. 2] Japanese Patent No. 2664194
[Patent Literature No. 3] International Publication No. WO 94/05025
[Patent Literature No. 4] Japanese Laid-open Patent Publication No. 2003-142171
[Patent Literature No. 5] Japanese Laid-open Patent Publication No. 2003-303629

SUMMARY OF INVENTION

Technical Problem

In a case where the porous semiconductor layer is caused to contain the light scattering particles as described in Patent Literature No. 5, an actual optical path length within the porous semiconductor layer is increased. Therefore, photoelectric conversion efficiency is not sufficiently improved and thus needs to be further improved. Furthermore, the method disclosed in Patent Literature No. 5 is required to be further improved because the porous semiconductor layer cracks at the time of calcination.

This invention has been made to solve the above problems, and provides a porous semiconductor layer that has high photoelectric conversion efficiency, a paste for a porous semiconductor layer that does not cause cracks at the time of manufacturing the porous semiconductor layer, and a dye-sensitized solar cell that includes the porous semiconductor layer.

Solution to Problem

In order to solve the above problems, the inventors of this invention conducted intensive investigation. As a result, they obtained knowledge that if anatase-type titanium oxide particles having a small particle size, that is, anatase-type titanium oxide particles having a large specific surface area are used in combination with rutile-type titanium oxide particles which have undergone a surface treatment using an insulating material and have a large particle size, a porous semiconductor layer having high photoelectric conversion efficiency is obtained. Based on this knowledge, the inventors accomplished this invention.

That is, the gist of this invention is as below.

[1] A porous semiconductor layer containing (A) anatase-type titanium oxide particles which have an average primary particle size of 1 nm to 70 nm, and (B) particles obtained by coating surfaces of rutile-type titanium oxide particles, which have an average primary particle size of 100 nm to 1,000 nm, with an insulating material.

[2] The porous semiconductor layer described in [1], in which the insulating material is one or more kinds of compound selected from a silicon compound, a magnesium compound, an aluminum compound, a zirconium compound, and a calcium compound.

[3] The porous semiconductor layer described in [1] or [2], in which the amount of the insulating material with which the particles (B) are coated is 2% by mass to 30% by mass.

[4] The porous semiconductor layer described in any one of [1] to [3], in which the amount of the particles (B) contained in the porous semiconductor layer is 1% by mass to 50% by mass.

[5] A paste for a porous semiconductor layer, containing (a) anatase-type titanium oxide particles which have an average primary particle size of 1 nm to 30 nm, and (B) particles obtained by coating surfaces of rutile-type titanium oxide particles, which have an average primary particle size of 100 nm to 1,000 nm, with an insulating material.

[6] A dye-sensitized solar cell including the porous semiconductor layer described in any one of [1] to [4].

Advantageous Effects of Invention

According to this invention, it is possible to provide a porous semiconductor layer that has high photoelectric conversion efficiency, a paste for a porous semiconductor layer that does not cause cracks at the time of manufacturing the porous semiconductor layer, and a dye-sensitized solar cell that includes the porous semiconductor layer.

DESCRIPTION OF EMBODIMENTS

Porous Semiconductor Layer

A porous semiconductor layer of this invention contains (A) anatase-type titanium oxide particles which have an average primary particle size of 1 nm to 70 nm, and (B) particles obtained by coating surfaces of rutile-type titanium oxide particles, which have an average primary particle size of 100 nm to 1,000 nm, with an insulating material.

<Particles (A)>

The particles (A) are anatase-type titanium oxide particles having an average primary particle size of 1 nm to 70 nm. If the average primary particle size of the particles (A) is within the above range, the specific surface area thereof is increased, and hence a large amount of dye can be adsorbed onto the particles.

The average primary particle size of the particles (A) is preferably 5 nm to 60 nm, more preferably 10 nm to 50 nm, even more preferably 12 nm to 45 nm, still more preferably 12 nm to 40 nm, and yet more preferably 15 nm to 40 nm.

In this invention, the particles (A) are preferably formed as a result of the growth of particles such as particles (a), which will be described later, by calcination at the time of manufacturing.

In this specification, the average primary particle size of the particles (A) is a value obtained by measuring major axis lengths of 100 particles by using a transmission electron microscope and calculating an average thereof. In a case where the particles has a rectangular shape, lengths of long side of the particles may be measured, and in a case where the particles has a spherical shape, maximum diameters thereof may be measured.

From the viewpoint of causing a large amount of dye to be adsorbed onto the particles, the specific surface area of the particles (A) is preferably 50 mg$^2$/g to 200 mg$^2$/g, more preferably 60 mg$^2$/g to 150 mg$^2$/g, and even more preferably 60 mg$^2$/g to 130 mg$^2$/g.

Examples of methods for adjusting the specific surface area include a method of adjusting the size or shape of the particles and a method of adjusting the specific surface area of two or more kinds of particles having different sizes or shapes in combination.

The anatase-type titanium oxide particles may not be spherical or may have unevenness on the particle surface.

It is not preferable that particles obtained by coating the surfaces of the particles (A) with an insulating material such as particles (B), which will be described later, are used for the porous semiconductor layer, because then photoelectric conversion efficiency is reduced.

From the viewpoint of particle size control, crystallinity, and dispersibility, the particles (A) are preferably prepared by a wet synthesis method.

Examples of the wet synthesis method include a method in which titanium raw materials such as titanium alkoxide and a titanium metal salt are hydrolyzed and the obtained precursor is turned into an oxide by being crystallized under hydrothermal conditions. Other examples of the wet synthesis method include a sol-gel method in which titanium raw materials are polymerized through hydrolysis in the presence of an acid-base catalyst by using water alone or using a mixed solvent of water, an alcohol, and the like.

A method for manufacturing the anatase-type titanium oxide particles is specifically described in Japanese Laid-open Patent Publication No. 2007-176753 and the like.

[Content of Particles (A)]

From the viewpoint of improving photoelectric conversion efficiency, the content of the particles (A) in the porous semiconductor layer is preferably 50% by mass to 99% by mass, and more preferably 55% by mass to 98.5% by mass.

<Particles (B)>

The particles (B) are particles obtained by coating surfaces of rutile-type titanium oxide particles, which have an average primary particle size of 100 nm to 1,000 nm, with an insulating material.

It is unclear why the use of rutile-type titanium oxide particles coated with an insulating material in the porous semiconductor layer required to have high electron conductivity improves photoelectric conversion efficiency. Presumably, because the rutile-type titanium oxide particles do not directly contact the particles (A), photoelectric conversion efficiency may be improved.

From the viewpoint of improving photoelectric conversion efficiency, the average primary particle size of the rutile-type titanium oxide particles is preferably 150 nm to 900 nm, more preferably 200 nm to 600 nm, and even more preferably 250 nm to 300 nm.

In this specification, the average primary particle size of the particles (B) is a value obtained by measuring major axis lengths of 100 particles by using a scanning electron microscope and calculating an average thereof. In a case where the particles has a rectangular shape, lengths of long sides of the particles may be measured, and in a case where the particles has a spherical shape, maximum diameters thereof may be measured.

The insulating material for coating the surfaces of rutile-type titanium oxide particles is not particularly limited as long as the insulating material is a material with which the surfaces of rutile-type titanium oxide particles can be coated and which has low electron conductivity. The insulating material is preferably an inorganic material that is not lost in a calcination step which will be described later.

Preferred examples of the insulating material specifically include one or more kinds of compound selected from a silicon compound, a magnesium compound, an aluminum compound, a zirconium compound, and a calcium compound. Specifically, one or more kinds of compound selected from silica, magnesia, alumina, zirconia, and calcia are more preferable.

Among the above insulating materials, a silicon compound and an aluminum compound are preferable, and it is preferable to use a silicon compound and an aluminum compound in combination. Specifically, silic and alumina are preferable, and it is more preferable to use silica and alumina in combination.

Examples of a method for coating surfaces of the rutile-type titanium oxide particles with an insulating material include a method in which a dispersion containing rutile-type titanium oxide particles, a sodium silicate solution, a sodium aluminate solution, and water is stirred, neutralized with sulfuric acid, and then heated for 1 to 5 hours to a temperature of 50° C. to 70° C.

In this invention, from the viewpoint of hindering contact between the rutile-type titanium oxide particles and the particles (A), the thickness of the insulating material formed on the surfaces of the rutile-type titanium oxide particles is preferably 3 nm to 25 nm, more preferably 5 nm to 20 nm, and even more preferably 8 nm to 15 nm.

Although it is preferable that the surfaces of the rutile-type titanium oxide particles are completely coated with the insulating material, the surfaces may be partially coated.

The amount of the insulating material with which the particles (B) are coated is preferably 2% by mass to 30% by mass, more preferably 5% by mass to 20% by mass, and even more preferably 5% by mass to 15% by mass. If the amount of the insulating material with which the particles (B) are coated is within the above range, photoelectric conversion efficiency is improved. The amount of the insulating material with which the particles (B) are coated represents a proportion of the insulating material in a total amount of the particles (B), and can be determined by dividing a mass of the insulating material in a total amount of the particles (B) by a total mass of the particles (B).

The mass of the particles and the insulating material can be determined by converting a value measured by ICP spectroscopy.

[Content of Particles (B)]

The content of the particles (B) in the porous semiconductor layer is preferably 1% by mass to 50% by mass, and more preferably 1.5% by mass to 45% by mass. If the content of the particles (B) is within the above range, a porous semiconductor layer having high photoelectric conversion efficiency can be obtained.

<Method for Manufacturing Porous Semiconductor Layer>

A method for manufacturing the porous semiconductor layer of this invention is not particularly limited, but is preferably a method in which a paste for a porous semiconductor layer, which will be described later, of this invention is applied onto a substrate and subjected to calcination.

Examples of a method for applying the paste for a porous semiconductor layer onto a substrate include a screen printing method, an ink jet method, and the like. Among these, from the viewpoint of ease of increasing a film thickness and reducing manufacturing costs, a screen printing method is preferable.

The calcination is preferably performed for 10 seconds to 4 hours at a temperature of 50° C. to 800° C. in the atmosphere or in an inert gas atmosphere. The calcination may be performed once at a constant temperature or performed twice or more by varying temperature. The applied paste for a porous semiconductor layer may be calcined after being dried.

From the viewpoint of photoelectric conversion efficiency, the thickness of the porous semiconductor layer is preferably 5 μm to 50 μm, more preferably 5 μm to 40 μm, and even more preferably 5 μm to 30 μm.

In order to improve photoelectric conversion efficiency, more dye, which will be described later, needs to be adsorbed onto the porous semiconductor layer. Therefore, it is preferred that the film-like porous semiconductor layer has a large specific surface area. For example, the specific surface area is preferably 50 $m^2/g$ to 200 $m^2/g$, more preferably 60 $m^2/g$ to 150 $m^2/g$, and even more preferably 60 $m^2/g$ to 130 $m^2/g$. In the present specification, the specific surface area is a value measured by a BET adsorption method.

In a case where a cross section of the porous semiconductor layer of this invention manufactured as above is observed with a scanning electron microscope, a state where the particles (A) and the particles (B) are mixed together is observed. That is, the particles (A) having an average primary particle size of 1 nm to 70 nm and the particles (B) having an average primary particle size of 100 nm to 1,000 nm are observed.

[Paste for Porous Semiconductor Layer]

The paste for a porous semiconductor layer of this invention contains (a) anatase-type titanium oxide particles which have an average primary particle size of 1 nm to 30 nm, and (B) particles obtained by coating surfaces of rutile-type titanium oxide particles, which have an average primary particle size of 100 nm to 1,000 nm, with an insulating material.

In a case where the paste for a porous semiconductor layer of this invention is measured using a laser diffration-type particle size analyzer (manufactured by HORIBA, Ltd., model number "LA-750"), a distribution in which particles having an average primary particle size of 1 nm to 30 nm form a peak and a distribution in which particles having an average particle size of 100 nm to 1,000 nm form a peak are observed as two bell curves.

In the distribution in which particles having an average primary particle size of 1 nm or greater or 30 nm or less form a peak, from the viewpoint of improving photoelectric conversion efficiency, the peak preferably appears within a range of 5 nm to 28 nm, more preferably appears within a range of 10 nm to 26 nm, and even more preferably appears within a range of 12 nm to 24 nm.

From the viewpoint of improving photoelectric conversion efficiency and inhibiting the occurrence of cracks at the time of manufacturing the porous semiconductor layer, in the distribution in which particles having an average primary particle size of 100 nm to 1,000 nm form a peak, the peak is preferably appears within a range of 150 nm to 900 nm, more preferably appears within a range of 200 to 600 nm, and even more preferably appears within a range of 250 nm to 300 nm.

<Particles (a)>

The particles (a) are anatase-type titanium oxide particles having an average primary particle size of 1 nm to 30 nm. If the average primary particle size of the particles (a) is within the above range, in a case where the paste for a porous semiconductor layer is made into a porous semiconductor layer by calcination, even though the particles (a) grow, the particles (a) can maintain a particle size by which the particles have a specific surface area suitable for them to adsorb a dye. More specifically, if the average primary particle size of the particles (a) is 1 nm to 30 nm, even though the particles (a) grow due to calcination, the growth of the particles (A) can be controlled such that the average primary particle size thereof is kept within the range of 1 nm to 70 nm.

From the viewpoint of improving dye adsorption performance of the porous semiconductor layer, the average primary particle size of the particles (a) is preferably 5 nm to 28 nm, more preferably 10 nm or greater and 26 nm or less, even more preferably 12 nm or greater or 24 nm or less, and still more preferably 15 nm or greater or 22 nm or less.

A specific surface area of the particles (a) is preferably 60 $m^2/g$ to 300 $m^2/g$, more preferably 60 $m^2/g$ to 200 $m^2/g$, and even more preferably 60 $m^2/g$ to 150 $m^2/g$. If the specific surface area of the particles (a) is within the above range, in a case where the paste for a porous semiconductor layer is made into a porous semiconductor layer by calcination, even though the particles (a) grow, the specific surface area suitable for the particles (a) to adsorb a dye can be maintained. More specifically, if the specific surface area of the particles (a) is 60 nm to 200 nm, even though the particles (a) grow due to calcination, the specific surface area of the particles (A) can be kept within a range of 50 $m^2/g$ to 200 $m^2/g$.

The specific surface area of the particles (a) is a value measured using a multipoint BET nitrogen adsorption method.

[Content of Particles (a)]

From the viewpoint of improving photoelectric conversion efficiency and inhibiting the occurrence of cracks at the time of forming a porous semiconductor layer, the content of the particles (a) in the paste for a porous semiconductor layer is preferably 10% by mass to 45% by mass, more preferably 15% by mass to 40% by mass, and even more preferably 20% by mass to 35% by mass.

<Particles (B)>

The particles (B) are particles obtained by coating surfaces of rutile-type titanium oxide particles, which have an average primary particle size of 100 nm to 1,000 nm, with an insulating material. In this invention, the use of the particles (B) prevents the occurrence of cracks at the time of manufacturing the porous semiconductor layer.

Preferred aspects of the average primary particle size of the particles (B), the insulating material for coating the rutile-type titanium oxide particles, the coating method of the insulating material, the coating amount, and the like are the same as the preferred aspects of the particles (B) of the aforementioned porous semiconductor layer of this invention.

<Ratio of Content of Particles (B) to Content of Particles (a)>

The content of the particles (B) with respect to 100 parts by mass of the particles (a) is preferably 1 part by mass to 50 parts by mass, and more preferably 1.5 parts by mass to 45 parts by mass. If the content of the particles (B) with respect to 100 parts by mass of the particles (a) is within the above range, a porous semiconductor layer having high photoelectric conversion efficiency can be obtained, and cracks do not occur at the time of manufacturing the porous semiconductor layer.

<Optional Component>

From the viewpoint of viscosity adjustment and the like, it is preferable to use a dispersion medium in the paste for a porous semiconductor layer of this invention.

The dispersion medium is not particularly limited, and it is preferred to use high-boiling point organic dispersion media like diols such as hexylene glycol and propylene glycol and terpineol.

From the viewpoint of preventing a decrease in viscosity of the paste for a porous semiconductor layer and deterioration of printing performance, the amount of the dispersion medium with respect to a total of 100 parts by mass of the particles (a) and the particles (B) is preferably 1 part by mass to 500 parts by mass, more preferably 50 parts by mass to 250 parts by mass, and even more preferably 150 parts by mass to 220 parts by mass.

From the viewpoint of adjusting viscosity or film thickness, the paste for a porous semiconductor layer of this invention may contain a cellulose-based resin such as ethyl cellulose, an acrylic resin, and the like.

Furthermore, generally used additives such as a leveling agent, a chelator, a surfactant, a titanium coupling agent, and a thickener may be appropriately added to the paste.

Examples of the leveling agent include water, ethylene glycol, polyethylene glycol, glycerin, and the like.

Examples of the chelator include acetylacetone, benzylacetone, acetic acid, and the like.

Examples of the surfactant include polyethylene glycol and the like.

Examples of the thickener include methyl cellulose, ethyl cellulose, and the like.

<Viscosity of Paste for Porous Semiconductor Layer>

A viscosity of the paste for a porous semiconductor layer that is measured using a dynamic viscoelasticity tester under the conditions of a temperature of 25° C. and a shear rate of 1 $s^{-1}$ is preferably 10 Pa·s to 1,000 Pa·s, and more preferably 100 Pas to 1,000 Pa·s.

<Method for Manufacturing Paste for Porous Semiconductor Layer>

The paste for a porous semiconductor layer can be manufactured by appropriately mixing together the particles (a), the particles (B), and, if necessary, optional components such as a dispersion medium.

More specifically, the paste can be obtained by mixing together the particles (a), the particles (B), a high-boiling point organic dispersion medium such as hexylene glycol or terpineol, a thickener such as ethyl cellulose, and the like.

[Dye-Sensitized Solar Cell]

A dye-sensitized solar cell of this invention includes the porous semiconductor layer of this invention, and the porous semiconductor layer is disposed between a transparent electrode and a counter electrode.

Because the porous semiconductor layer of this invention has high photoelectric conversion efficiency, it is possible to obtain a dye-sensitized solar cell having high power generation efficiency.

For example, the dye-sensitized solar cell of this invention can be constituted in a manner in which a counter electrode is disposed to face an electrode obtained by causing a dye to be adsorbed onto the porous semiconductor layer of this invention such that a cell is constructed, and an electrolyte is sealed into the cell through a side frame member.

Figure 1:
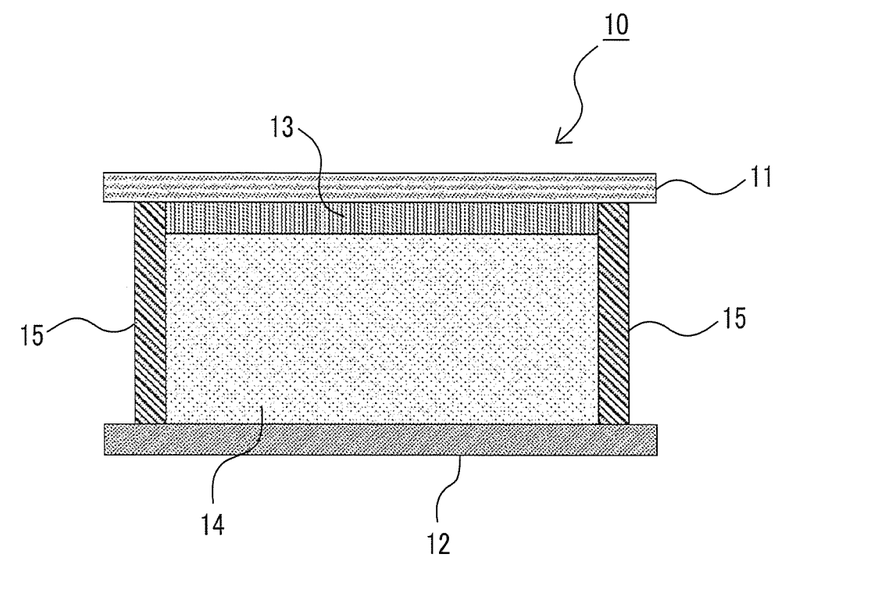
FIG. 1 is a view schematically showing an exemplary constitution of a dye-sensitized solar cell of this invention.

FIG. 1 shows an example of the dye-sensitized solar cell of this invention. A dye-sensitized solar cell 10 of the present embodiment has a cell in which a transparent electrode 11 and a counter electrode 12 are disposed to face each other. An electrolyte 14 is sealed into the cell through a side frame member 15. The transparent electrode 11 is composed of a transparent conductive substrate, and constitutes an anode electrode. The counter electrode 12 is composed of a conductive substrate, and constitutes a cathode electrode. A porous semiconductor layer 13 onto which a dye is adsorbed is provided on the transparent electrode 11.

The transparent electrode 11 and the counter electrode 12 are disposed to face each other across the electrolyte 14 at an interval of several μm to several mm. The dye adsorbed onto the porous semiconductor layer 13 is excited with visible light, and the resulting electron are transferred to the porous semiconductor layer 13, whereby power is generated.

<Transparent Electrode>

The transparent electrode 11 is not particularly limited as long as it is a conductive substrate. For example, it is possible to use a conductive substrate or the like obtained by providing a conductive film containing one or more kinds of material selected from fluorine-doped tin oxide and ITO onto a substrate constituted with glass, plastic, or the like.

<Porous Semiconductor Layer>

The porous semiconductor layer 13 can be provided in a manner in which the paste for a porous semiconductor layer of this invention is applied to the transparent electrode 11 by a screen printing method, an ink jet method, or the like and then subjected to calcination.

In a case where the paste for a porous semiconductor layer of this invention is used, cracks do not occur at the time of manufacturing, and the obtained porous semiconductor layer has high photoelectric conversion efficiency.

[Dye Used in Porous Semiconductor Layer]

As the dye which is adsorbed onto the porous semiconductor layer 13 and functions as a photosensitizer, from the viewpoint of causing the dye to be firmly adsorbed onto the porous semiconductor layer 13, a dye having an interlocking group such as a carboxylic acid group, a carboxylic anhydride group, or a sulfonic acid group in a dye molecule is preferable. The interlocking group is a group providing electric coupling that facilitates the transfer of electrons between the excited dye and a conduction band of the porous semiconductor layer.

As the interlocking group-containing dye, for example, one or more kinds of dye selected from a ruthenium bipyridine-based dye, an azo-based dye, a quinone-based dye, a quinoneimine-based dye, a squarylium-based dye, a cyanine-based dye, a merocyanine-based dye, a porphyrin-based dye, a phthalocyanine-based dye, an indigo-based dye, and a naphthalocyanine-based dye are preferable.

A typical example of a method for causing a dye to be adsorbed onto the porous semiconductor layer 13 include a method of dipping a laminate, in which the porous semiconductor layer 13 is formed on the transparent electrode 11, into a solution in which a dye is dissolved (solution for dye adsorption).

Examples of solvents dissolving the dye include alcohols such as ethanol, ketones such as acetone, ethers such as diethylether and tetrahydrofuran, nitrogen compounds such as acetonitrile, halogenated aliphatic hydrocarbon such as chloroform, aliphatic hydrocarbon such as hexane, aromatic hydrocarbon such as benzene, esters such as ethyl acetate and butyl acetate, water, and the like. Two or more kinds of these solvents may be used by being mixed together.

A dye concentration in the solution can be appropriately adjusted according to the type of dye and solvent to be used. In order to improve adsorptivity, a high dye concentration of, for example, $1 \times 10^{-5}$ mol/L or higher is preferred.

<Counter Electrode>

The counter electrode 12 is not particularly limited and is constituted with, for example, a substrate constituted with a metal such as Al or stainless steel, glass, plastic, or the like and a conductive layer of Pt, C, Ni, Cr, stainless steel, fluorine-doped tin oxide, ITO, or the like formed on the substrate. The counter electrode 12 can also constitute conductive glass whose surface is provided with a conductive layer of fluorine-doped tin oxide or the like. It is preferred to use Pt because then the counter electrode 12 also functions as a catalyst layer.

<Electrolyte (Electrolytic Solution)>

As the electrolyte (electrolytic solution) 14, a solid electrolyte and a liquid electrolyte can be used. Examples of the electrolyte 14 include one or more kinds of electrolyte selected from an iodine-based electrolyte, a bromine-based electrolyte, a selenium-based electrolyte, and a sulfur-based electrolyte.

The electrolyte 14 can be in the form of an electrolytic solution obtained by dissolving $I_2$, LiI, dimethyl propylimidazolium iodide, or the like in an organic solvent such as acetonitrile, methoxyacetonitrile, propylene carbonate, or ethylene carbonate.

In a case where the electrolyte 14 in the form of a liquid is used, it is preferable to provide a partition wall between the porous semiconductor layer 13 and the counter electrode 12 and to inject the electrolyte 14 into the formed space.

<Method for Manufacturing Dye-Sensitized Solar Cell>

A method for manufacturing the dye-sensitized solar cell of this invention is not particularly limited. The dye-sensitized solar cell can be manufactured by a known method by appropriately using constituent materials such as the transparent electrode 11, the counter electrode 12, and the porous semiconductor layer 13. The dye-sensitized solar cell of this invention is not particularly limited except that the porous semiconductor layer of this invention is used, and constituent materials used in general dye-sensitized solar cells can be appropriately used. For example, a light reflecting layer, an insulating layer, and the like (not shown in the drawing) can be provided between the porous semiconductor layer 13 and the counter electrode 12.

EXAMPLES

Hereinafter, this invention will be more specifically described based on examples and comparative examples, but this invention is not limited to the examples.

An average primary particle size of the particles (A) was measured using a transmission electron microscope (H-800, made by Hitachi High-Technologies Corporation). An average primary particle size of the particles (B) was measured using a scanning electron microscope (S-4000, made by Hitachi High-Technologies Corporation).

A specific surface area of the particles was measured by a multipoint BET nitrogen adsorption method by using a specific surface area meter (Belsorp II, made by Microtrac-BEL Corp.).

Crystal structures of the prepared particles were evaluated using an X-ray diffractometer (PANalytical X'pert PRO, made by Spectris).

Example 1

Preparation of Particles (a-1): Preparation of Anatase-Type Titanium Oxide Particles 1 L of pure water was put into a glass container having a volume of 1 L and stirred, and in this state, 280 g of titanium tetraisopropoxide was added dropwise thereto, thereby obtaining a white suspension. By filtering the white suspension, a white cake was obtained. Then, the white cake and 60 g of a 25% by mass aqueous tetramethyl ammonium hydroxide solution were put into an autoclave, and pure water was added thereto such that the a total amount of the mixture became 1 kg. By heating the mixture for 3 hours to 150° C., a titanium oxide particle dispersion was obtained.

The obtained titanium oxide particles were evaluated using an X-ray diffractometer. As a result, it was confirmed that they were titanium oxide particles forming a single anatase layer. An average primary particle size of the obtained particles was 18 nm, and a specific surface area thereof was 85 $m^2/g$.

Preparation of Particles (B-1): Preparation of Titanium Oxide Particles Whose Surfaces are Coated with Silica and Alumina Rutile-type titanium oxide particles (made by SUMITOMO OSAKA CEMENT CO., LTD.) having an average primary particle size of 280 nm, water, a sodium silicate solution, and a sodium aluminate dispersion were mixed together at a mixing ratio (rutile-type titanium oxide/silica/alumina) of 90/2/8, thereby obtaining 100 g of a dispersion. Then, the dispersion was neutralized with sulfuric acid and heated for 3 hours to 60° C., thereby treating surfaces of the rutile-type titanium oxide particles with silica and alumina. By filtering the solution after heating, particles (B-1) were obtained.

The particles (B-1) were observed with a transmission electron microscope. As a result, it was confirmed that a coating film having a thickness of 10 nm was formed on the surfaces of the particles.

(Preparation of Paste for Porous Semiconductor)

29.4 parts by mass of the particles (a-1), 0.6 parts by mass of the particles (B-1), 10 parts by mass of ethyl cellulose, and 60 parts by mass of terpineol were mixed together, thereby preparing 100 g of a paste for a porous semiconductor layer of Example 1. The viscosity of the paste for a porous light-reflecting insulating layer was measured using a dynamic viscoelasticity tester under the conditions of a temperature of 25° C. and a shear rate of 1 s$^{-1}$. As a result, it was confirmed that the viscosity was 400 mPa·s.

<Preparation of Dye-Sensitized Solar Cell>

(Preparation of Porous Semiconductor Layer)

The obtained paste for a porous semiconductor was screen-printed on a transparent electrode such that a thickness of a calcined film became 7 μm, followed by calcination for 1 hour at 500° C., thereby preparing a porous semiconductor layer of Example 1.

As a result of visually observing the appearance of the porous semiconductor layer, no crack was observed in the film.

Furthermore, the appearance of the porous semiconductor layer was viewed by observing a cross section thereof with a transmission electron microscope, and as a result, the particles (A) having an average primary particle size of 40 nm were observed. As a result of observing the cross section with a scanning electron microscope, the particles (B) having an average primary particle size of 280 nm were observed.

Then, the substrate on which the porous semiconductor layer was formed was dipped into a 0.3 mM Ru metal complex dye solution (dye: Black Dye, made by DAiSOL, Inc) for 24 hours such that the dye was adsorbed thereonto, thereby obtaining an electrode.

(Preparation of Electrolytic Solution)

Acetonitrile was mixed with 0.6 M 1,2-dimethyl-3-propylimidazolium iodine salt as a supporting electrolyte, 0.1 M lithium iodide, 0.05 M iodine, and 0.5 M t-butylpyridine, thereby preparing an electrolytic solution.

(Preparation of Dye-Sensitized Solar Cell)

The obtained electrode and a glass substrate, on which a platinum film was formed as a counter electrode, were disposed such that the porous semiconductor layer and the platinum film faced each other, and the aforementioned electrolytic solution was injected and sealed into a space between the obtained electrode and the counter electrode through a side frame member, thereby preparing a dye-sensitized solar cell of Example 1.

(Evaluation of Photoelectric Conversion Efficiency)

By using a solar simulator (made by Yamashita Denso Corporation), the dye-sensitized solar cell of Example 1 was irradiated with pseudo-sunlight, and I-V characteristics were measured using a current voltage detector (made by Yamashita Denso Corporation) thereby determining photoelectric conversion efficiency. As a result, it was confirmed that the photoelectric conversion efficiency was 5.4%. The result is shown in Table 1.

Example 2

Preparation of Particles (a-2): Preparation of Anatase-Type Titanium Oxide Particles Particles (a-2) were prepared in the same manner as used for preparing the particles (a-1), except for heating was performed for 4.5 hours at 210° C. As a result of evaluating the particles (a-2) in the same manner as used for evaluating the particles (a-1), it was confirmed that the particles (a-2) were titanium oxide particles forming a single anatase layer. The obtained particles (a-2) had an average primary particle size of 23 nm and a specific surface area of 65 m$^2$/g.

(Preparation of Pate for Porous Semiconductor Layer)

A paste for a porous semiconductor layer of Example 2 was prepared in the same manner as in Example 1, except that the particles (a-2) were used as the particles (a). The viscosity of the paste for a porous light-reflecting insulating layer was measured using a dynamic viscoelasticity tester under the conditions of a temperature of 25° C. and a shear rate of 1 s$^{-1}$. As a result, it was confirmed that the viscosity was 350 mPa·s.

A porous semiconductor layer of Example 2 was prepared in the same manner as in Example 1, except that the paste for a porous semiconductor layer of Example 2 was used as a paste for a porous semiconductor layer. As a result of visually observing the appearance of the porous semiconductor layer, no crack was observed in the film.

Furthermore, the appearance of the porous semiconductor layer was observed with a transmission electron microscope, and as a result, the particles (A) having an average primary particle size of 45 nm were observed. As a result of observing the porous semiconductor layer with a scanning electron microscope, the particles (B) having an average primary particle size of 280 nm were observed.

A dye-sensitized solar cell of Example 2 was obtained in the same manner as in Example 1, except that the porous semiconductor layer of Example 2 was used as a porous semiconductor layer.

The photoelectric conversion efficiency of the solar cell measured in the same manner as in Example 1 was 5.7%. The result is shown in Table 1.

Example 3

Preparation of Particles (a-3): Preparation of Anatase-Type Titanium Oxide Particles Particles (a-3) were prepared in the same manner as in Example 1, except that heating was performed at 120° C.

As a result of evaluating the particles (a-3) in the same manner as used for evaluating the particles (a-1), it was confirmed that the particles (a-3) were titanium oxide particles forming a single anatase layer. The obtained particles had an average primary particle size of 13 nm and a specific surface area of 120 m$^2$/g.

A paste for a porous semiconductor layer of Example 3 was prepared in the same manner as in Example 1, except that the particles (a-3) were used as the particles (a). The viscosity of the paste for a porous light-reflecting insulating layer was measured using a dynamic viscoelasticity meter under the conditions of a temperature of 25° C. and a shear rate of 1 s$^{-1}$. As a result, it was confirmed that the viscosity was 500 mPa·s.

A porous semiconductor layer of Example 3 was prepared in the same manner as in Example 1, except that the paste for a porous semiconductor layer of Example 3 was used as a paste for a porous semiconductor layer.

As a result of visually observing the appearance of the porous semiconductor layer, no crack was observed in the film.

Furthermore, as a result of observing the appearance of the porous semiconductor layer with a transmission electron microscope, the particles (A) having an average primary particle size of 35 nm were obtained. As a result of observing the porous semiconductor layer with a scanning electron microscope, the particles (B) having an average primary particle size of 280 nm were observed.

A dye-sensitized solar cell of Example 3 was obtained in the same manner as in Example 1, except that the porous semiconductor layer of Example 3 was used as a porous semiconductor layer.

The photoelectric conversion efficiency of the solar cell measured in the same manner as in Example 1 was 5.6%. The results is shown in Table 1.

Example 4

21.4 parts by mass of the particles (a-1), 8.6 parts by mass of the particles (B-1), 10 parts by mass of ethyl cellulose, and 60 parts by mass of terpineol were mixed together, thereby preparing a paste for a porous semiconductor layer of Example 4. The viscosity of the paste for a porous light-reflecting insulating layer was measured using a dynamic viscoelasticity meter under the conditions of a temperature of 25° C. and a shear rate of 1 s$^{-1}$. As a result, it was confirmed that the viscosity was 400 mPa·s.

A porous semiconductor layer of Example 4 was prepared in the same manner as in Example 1, except that the pate for a porous semiconductor layer of Example 4 was used as a paste for a porous semiconductor layer.

As a result of visually observing the appearance of the porous semiconductor layer, no crack was observed in the film.

Furthermore, as a result of observing the appearance of the porous semiconductor layer with a transmission electron microscope, the particles (A) having an average primary particle size of 40 nm were observed. As a result of observing the porous semiconductor layer with a scanning electron microscope, the particles (B) having an average primary particle size of 280 nm were observed.

A dye-sensitized solar cell of Example 4 was obtained in the same manner as in Example 1, except that the porous semiconductor layer of Example 4 was used as a porous semiconductor layer.

The photoelectric conversion efficiency of the solar cell observed in the same manner as in Example 1 was 5.1%. The result is shown in Table 1.

Example 5

Preparation of Particles (a-4): Preparation of Rutile-Type Titanium Oxide Particles Whose Surfaces are Coated with Silica Particles (a-4) were obtained in the same method as used for preparing the particles (a-1), except that rutile-type titanium oxide particles and sodium silicate were mixed together at a mixing ratio (titanium oxide/silica) of 90/10.

(Preparation of Paste for Porous Semiconductor Layer)

A paste for a porous semiconductor layer of Example 5 was prepared in the same manner as in Example 1, except that the particles (a-4) were used as the particles (a). The viscosity of the paste for a porous light-reflecting insulating layer was measured using a dynamic viscoelasticity meter under the conditions of a temperature of 25° C. and a shear rate of 1 s$^{-1}$. As a result, it was confirmed that the viscosity was 400 mPa·s.

A porous semiconductor layer of Example 5 was prepared in the same manner as in Example 1, except that the paste for a porous semiconductor layer of Example 5 was used as a paste for a porous semiconductor layer.

As a result of visually observing the appearance of the porous semiconductor layer, no crack was obtained in the film.

Furthermore, as a result of observing the appearance of the porous semiconductor layer with a transmission electron microscope, the particles (A) having an average primary particle size of 40 nm were observed. As a result of observing the porous semiconductor layer with a scanning electron microscope, the particles (B) having an average primary particle size of 280 nm were observed.

A dye-sensitized solar cell of Example 5 was obtained in the same manner as in Example 1, except that the porous semiconductor layer of Example 5 was used as a porous semiconductor layer.

The photoelectric conversion efficiency of the solar cell measured in the same manner as in Example 1 was 5.3%. The result is shown in Table 1.

Comparative Example 1

Preparation of Paste for Porous Semiconductor

A paste for a porous semiconductor layer of Comparative Example 1 was prepared in the same manner as in Example 1, except that 30 parts by mass of the particles (a-1) were used as the particles (a), and the particles (B-1) were not used. The viscosity of the paste for a porous light-reflecting insulating layer was measured using an dynamic viscoelasticity meter under the conditions of a temperature of 25° C. and a shear rate of 1 s$^{-1}$. As a result, it was confirmed that the viscosity was 500 mPa·s.

A porous semiconductor layer of Comparative Example 1 was prepared in the same manner as in Example 1, except that the paste for a porous semiconductor layer of Comparative Example 1 was used as a paste for a porous semiconductor layer.

As a result of visually observing the appearance of the porous semiconductor layer, many cracks were observed in the film. The result is shown in Table 1.

Comparative Example 2

A paste for a porous semiconductor layer of Comparative Example 2 was prepared in the same manner as in Example 1, except that 30 parts by mass of the particles (a-2) were used as the particles (a), and the particles (B-1) were not used. The viscosity of the paste for a porous light-reflecting insulating layer was measured using an dynamic viscoelasticity meter under the conditions of a temperature of 25° C. and a shear rate of 1 s$^{-1}$. As a result, it was confirmed that the viscosity was 400 mPa·s.

A porous semiconductor layer of Comparative Example 2 was prepared in the same manner as in Example 1, except that the paste for a porous semiconductor layer of Comparative Example 2 was used as a paste for a porous semiconductor layer.

As a result of visually observing the appearance of the porous semiconductor layer, no crack was observed in the film.

A dye-sensitized solar cell of Comparative Example 2 was obtained in the same manner as in Example 1, except that the porous semiconductor layer of Comparative Example 2 was used as a porous semiconductor layer.

The photoelectric conversion efficiency of the solar cell measured in the same manner as in Example 1 was 4.1%. The result is shown in Table 1.

Comparative Example 3

Preparation of Particles (x-1)

Preparation of Anatase-Type Titanium Oxide Particles

Particles (x-1) were prepared in the same manner used for preparing the particles (a-1), except that heating was performed at 240° C.

As a result of evaluating the particles (x-1) in the same manner as used for evaluating the particles (a-1), it was confirmed that the particles (x-1) were titanium oxide particles forming a single anatase layer.

The obtained particles had an average primary particle size of 32 nm and a specific surface area of 50 m$^2$/g.

A paste for a porous semiconductor layer of Comparative Example 3 was prepared in the same manner as in Example 1, except that the particles (x-1) were used instead of the particles (a). The viscosity of the paste for a porous light-reflecting insulating layer was measured using a dynamic viscoelasticity meter under the conditions of a temperature of 25° C. and a shear rate of 1 s$^{-1}$. As a result, it was confirmed that the viscosity was 300 mPa·s.

A porous semiconductor layer of Comparative Example 3 was prepared in the same manner as in Example 1, except that the paste for a porous semiconductor layer of Comparative Example 3 was used as a paste for a porous semiconductor layer.

As a result of visually observing the appearance of the porous semiconductor layer, no crack was observed in the film.

Furthermore, as a result of observing the appearance of the porous semiconductor layer with a transmission electron microscope, particles (X) having an average primary particle size of 75 nm were observed. As a result of observing the porous semiconductor layer with a scanning electron microscope, the particles (B) having an average primary particle size of 280 nm were observed.

A dye-sensitized solar cell of Comparative Example 3 was obtained in the same manner as in Example 1, except that the porous semiconductor layer of Comparative Example 3 was used as a porous semiconductor layer.

The photoelectric conversion efficiency of the solar cell measured in the same manner as in Example 1 was 4.5° 1 which was low efficiency. The result is shown in Table 1.

Comparative Example 4

Preparation of Paste for Porous Semiconductor Layer

A paste for a porous semiconductor layer of Comparative Example 4 was prepared in the same manner as in Example 1, except that rutile-type titanium oxide particles (made by SUMITOMO OSAKA CEMENT CO., LTD.) having an average primary particle size of 280 nm, that is, rutile-type titanium oxide particles whose surfaces were not coated with an insulating material were used as the particles (B). The viscosity of the paste for a porous light-reflecting insulating layer was measured using a dynamic viscoelasticity meter under the conditions of a temperature of 25° C. and a shear rate of 1 s$^{-1}$. As a result, it was confirmed that the viscosity was 400 mPa·s.

A porous semiconductor layer of Comparative Example 4 was prepared in the same manner as in Example 1, except that the paste for a porous semiconductor layer of Comparative Example 4 was used as a paste for a porous semiconductor layer.

As a result of visually observing the appearance of the porous semiconductor layer, no crack was observed in the film.

A dye-sensitized solar cell of Comparative Example 4 was obtained in the same manner as in Example 1, except that the porous semiconductor layer of Comparative Example 4 was used as a porous semiconductor layer.

The photoelectric conversion efficiency of the solar cell measured in the same manner as in Example 1 was 4.2% which was low efficiency. The result is shown in Table 1.

TABLE 1

| | | | Example | | | | | Comparative Example | | | |
|---|---|---|---|---|---|---|---|---|---|---|---|
| | | | 1 | 2 | 3 | 4 | 5 | 1 | 2 | 3 | 4 |
| Paste for porous semiconductor layer | Particles (a) | Average primary particle size (nm) | 18 | 23 | 13 | 18 | 18 | 18 | 23 | 32 | 18 |
| | | Specific surface area (m$^2$/g) | 85 | 65 | 120 | 85 | 85 | 85 | 65 | 50 | 85 |
| | | Formulated amount (part by mass) | 29.4 | 29.4 | 29.4 | 21.4 | 29.4 | 30 | 30 | 29.4 | 29.4 |
| | Particles (B) | Average primary particle size (nm) | 280 | 280 | 280 | 280 | 280 | — | — | 280 | 280 |
| | | Type of insulating material | | Silica/alumina | | Silica | | — | — | Silica/alumina | — |

TABLE 1-continued

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
|  | Coating amount (% by mass) | 10 | 10 | 10 | 10 | 10 | — | — | 10 | — |
|  | Formulated amount (part by mass) | 0.6 | 0.6 | 0.6 | 8.6 | 0.6 | — | — | 0.6 | 0.6 |
| Amount of particles (B) with respect to 100 parts by mass of particles (a) (part by mass) |  | 2.0 | 2.0 | 2.0 | 40 | 2.0 | — | — | 2.0 | 2.0 |
| Optional component | Ethyl cellulose | 10 | 10 | 10 | 10 | 10 | 10 | 10 | 10 | 10 |
|  | Terpineol | 60 | 60 | 60 | 60 | 60 | 60 | 60 | 60 | 60 |
| Average primary particle size of particles (A) in porous semiconductor layer (nm) |  | 40 | 45 | 35 | 40 | 40 | 40 | 45 | 75 | 40 |
| Evaluation | Photoelectric conversion efficiency (%) | 5.4 | 5.7 | 5.6 | 5.1 | 5.3 | — | 4.1 | 4.5 | 4.2 |
|  | Presence or absence of crack | Absent | Absent | Absent | Absent | Absent | Present | Absent | Absent | Absent |

As is evident from the above results, the porous semiconductor layer of this invention has excellent photoelectric conversion efficiency. Furthermore, if the paste for a porous semiconductor layer of this invention is used, the occurrence of cracks at the time of manufacturing a porous semiconductor layer can be inhibited.

The invention claimed is:

1. A porous semiconductor layer comprising:
  (A) anatase titanium oxide particles which have an average primary particle size of 1 nm to 70 nm; and
  (B) particles obtained by coating surfaces of rutile titanium oxide particles, which have an average primary particle size of 100 nm to 1,000 nm, with an insulating material,
  wherein the insulating material is a solid-state material, an amount of the insulating material with which the particles (B) are coated is 2% by mass to 30% by mass based on a total amount of the particles (B), and the insulating material is not coated on the anatase titanium oxide particles (A).

2. The porous semiconductor layer according to claim 1, wherein the insulating material is one or more compounds selected from a silicon compound, a magnesium compound, an aluminum compound, a zirconium compound, and a calcium compound.

3. The porous semiconductor layer according to claim 1, wherein an amount of the particles (B) contained in the porous semiconductor layer is 1% by mass to 50% by mass.

4. The porous semiconductor layer according to claim 1, which is comprised in an electrode.

5. A dye-sensitized solar cell comprising the porous semiconductor layer according to claim 1.

6. A paste for a porous semiconductor layer, comprising:
  (a) anatase titanium oxide particles which have an average primary particle size of 1 nm to 30 nm; and
  (B) particles obtained by coating surfaces of rutile titanium oxide particles, which have an average primary particle size of 100 nm to 1,000 nm, with an insulating material,
  wherein the insulating material is a solid-state material, an amount of the insulating material with which the particles (B) are coated is 2% by mass to 30% by mass based on a total amount of the particles (B), and the insulating material is not coated on the anatase titanium oxide particles (a).

* * * * *